United States Patent [19]

Ohno et al.

[11] Patent Number: 5,289,453

[45] Date of Patent: Feb. 22, 1994

[54] OPTICAL INFORMATION RECORDING METHOD

[75] Inventors: Eiji Ohno, Hirakata; Kenichi Nishiuchi, Moriguchi; Noboru Yamada, Hirakata; Nobuo Akahira, Yawata, all of Japan

[73] Assignee: Matsushita Electric Industrial Co., Ltd., Osaka, Japan

[21] Appl. No.: 937,101

[22] Filed: Aug. 31, 1992

Related U.S. Application Data

[60] Continuation-in-part of Ser. No. 765,512, Sep. 25, 1991, Pat. No. 5,233,599, which is a division of Ser. No. 657,822, Feb. 20, 1991, Pat. No. 5,130,971.

[30] Foreign Application Priority Data

Mar. 14, 1990 [JP] Japan .................. 2-63165
Aug. 30, 1991 [JP] Japan ................ 3-219551

[51] Int. Cl.$^5$ ............................................. G11B 7/00
[52] U.S. Cl. ...................................... 369/100; 369/116
[58] Field of Search ............... 369/100, 104, 116, 107, 369/99

[56] References Cited

U.S. PATENT DOCUMENTS 5,084,857 1/1992 Miyauchi et al. ................. 369/116
5,109,373 4/1992 Ohno et al. ......................... 369/116

FOREIGN PATENT DOCUMENTS 63-096750 10/1986 Japan .
2-029927 1/1990 Japan .
3-178050 8/1991 Japan .

Primary Examiner—Paul M. Dzierzynski
Assistant Examiner—Don Wong
Attorney, Agent, or Firm—Wenderoth, Lind & Ponack

[57] ABSTRACT

An optical information recording method in which a digital signal subjected to pulse width modulation is overwritten, by using one laser spot, on an optical disk including a first dielectric film, a recording film, a second dielectric film and a reflecting film stacked on a substrate in this order; the recording film having composition defined by a formula $Ge_xSb_yTe_z$ satisfying $45 \leq z \leq 55.5$, $0.5 \leq y/(x+y) \leq 0.72$ and $x+y+z=100$; the recording film having a thickness of 10 to 35 nm; the second dielectric film having a thickness of 5 to 40 nm; the reflecting film having a thickness of 35 nm or more; the optical information recording method comprising the steps of: converting each of a plurality of pulses contained in the digital signal, into a pulse train composed of pulses; and modulating a laser power between an erasing level and a recording level so as to overwrite the digital signal on the optical disk.

15 Claims, 14 Drawing Sheets

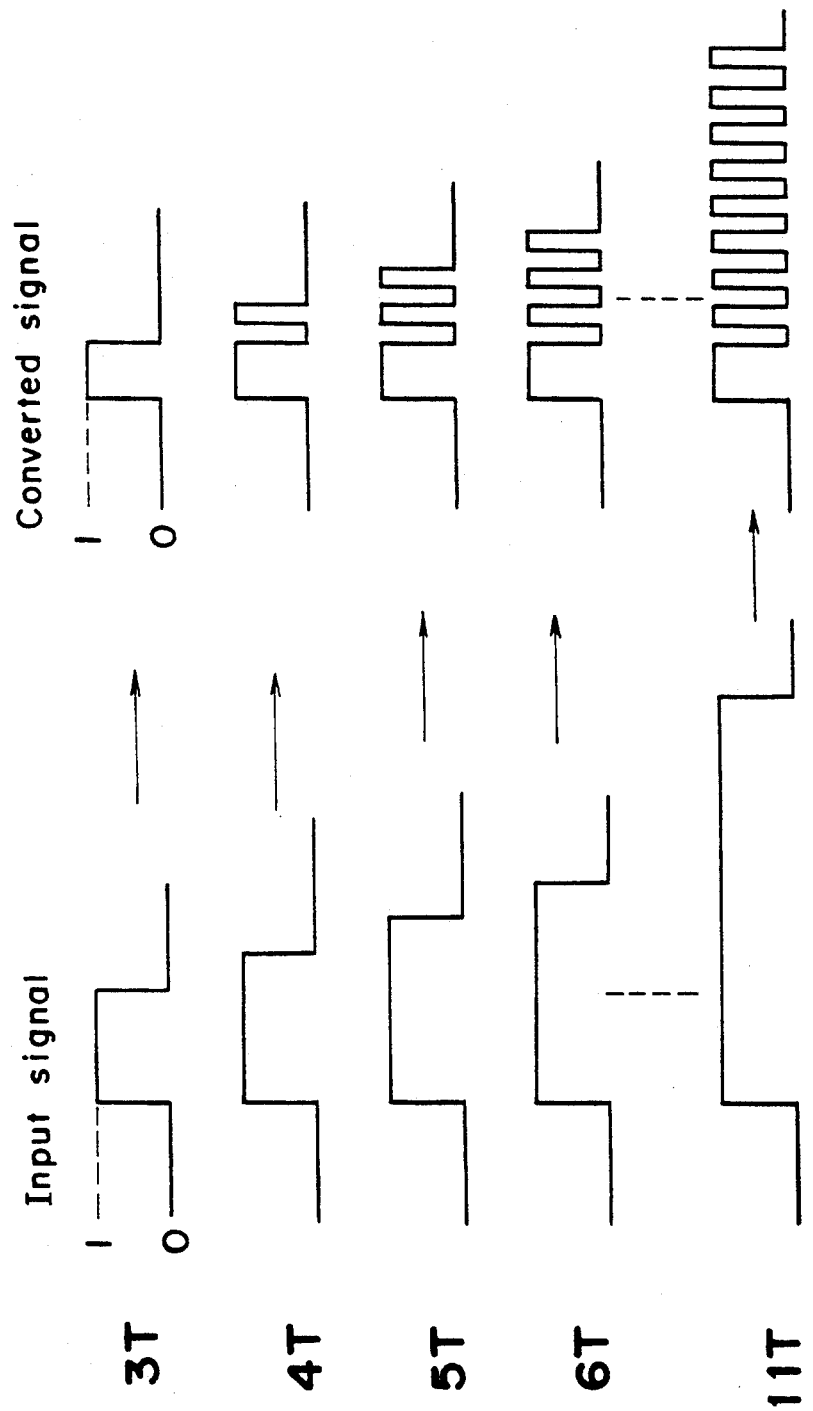

Laser beam

OPTICAL INFORMATION RECORDING METHOD

CROSS-REFERENCE TO RELATED APPLICATION

This application is a continuation-in-part of pending application Ser. No. 07/765,512, filed Sep. 25, 1991, now U.S. Pat. No. 5,233,599 which is in turn a divisional of application Ser. No. 07/657,822, filed Feb. 20, 1991, now U.S. Pat. No. 5,130,971.

BACKGROUND OF THE INVENTION

The present invention relates to a method of recording optical information on an optical disk for recording and reproducing optical information at high density by using laser beams, etc.

A technology that highly dense information is reproduced or recorded by using laser beams is known and is mainly put to practical use as an optical disk. A compact disk (CD) on which musical signals are preliminarily recorded is commercially available as one example of application of the optical disk. This compact disk is exclusively used for reproduction of the musical signals. Thus, users of the compact disk can reproduce the musical signals but cannot record signals on the compact disk or erase the signals from the compact disk. Thus, recently, research and development have been vigorously conducted on a rewritable optical disk so as to obtain a compact disk enabling recording and erasure of the signals.

The rewritable optical disk can be roughly classified into a magnetooptical disk and a phase change disk. In the phase change disk, a recording film is reversibly converted between amorphous state and crystalline state by changing irradiation conditions of laser beams so as to record signals and reproduction is performed by optically detecting difference in reflectance between amorphous state and crystalline state of the recording film. Thus, as compared with the magnetooptical disk, the phase change disk has such great advantages that signals can be reproduced by change of reflectance of laser beams in the same manner as the compact disk and single beam overwriting can be easily achieved through modulation of laser power.

As one example of the phase change type rewritable compact disk, an optical disk is proposed in Bulletin of Symposium on Optical Memory (1988), p.41-42. This prior art optical disk has a structure in which a recording film 16 is interposed between dielectric films 15 and 17 as shown in FIG. 17 and the recording film 16 is made of GeSbTe alloy falling in the hatched composition range of FIG. 16.

When CD signals have been actually recorded on the above mentioned prior art optical disk by a conventional single beam overwriting procedure, distortion of the reproduced wave form is impracticably large. This is because shape of the recording mark is not symmetric with respect to its front and rear ends, namely the recording mark is distorted into a teardrop-shape such that the arcuate front and rear ends of the recording mark are thin and thick, respectively. More specifically, in the case where recording is performed by laser beams having a modulated wave form shown in FIG. 18a, temperature of the recording film is low at the front end of the recording mark and becomes higher towards the rear end of the recording mark due to heat accumulation phenomenon as shown in FIG. 18b. As a result, the recording mark has a teardrop-shape as shown in FIG. 18c. The heat accumulation phenomenon becomes more conspicuous as relative speed between a laser spot and the optical disk, i.e. linear speed is reduced further. When linear speed is quite low, for example, 1.2 to 1.4 m/sec. as in the case of the compact disk, distortion of shape of the recording mark also becomes large. This distortion of shape of the recording mark leads to distortion of the reproduced wave form, thereby resulting in increase of jitter. Since especially, an EFM (eight to fourteen modulation) signal acting as CD standards is a pulse width modulation (PWM) signal and length and interval of the recording mark of the EFM signal indicate information, distortion of the recording mark forms a leading cause of errors.

Also when linear speed is further high, for example, 10 m/sec., increase of jitter due to distortion of the recording mark is observed so as to produce errors.

In order to solve the above described problem, the present inventors previously proposed in U.S. patent application Ser. No. 546,906 filed on Jul. 2, 1990, a method and an apparatus in which a recording pulse for forming one recording mark is initially converted into a pulse train composed of a plurality of short pulses and then, is recorded. Through subsequent extensive study, the present inventors have found also in the rewritable optical disk that by specifying structure of an optical disk and composition of a recording film of the optical disk and by specifying a recording method, a recording mark having small distortion of its shape can be formed, reproduced signals having quality equivalent to that of a compact disk can be obtained and repetition characteristics of recording and erasure are also excellent.

SUMMARY OF THE INVENTION

Accordingly, an essential object of the present invention is to provide an optical information recording method in which distortion of shape of a recording mark is minimized, reproduced signals having quality equivalent to that of a compact disk can be obtained and repetition characteristics of recording and erasure are excellent.

In order to accomplish this object of the present invention, there is provided an optical information recording method according to the present invention, in which a digital signal subjected to pulse width modulation is overwritten on an optical disk by using one laser spot; the optical disk including a first dielectric film, a recording film, a second dielectric film and a reflecting film stacked on a substrate in this order; the recording film having composition defined by a formula $Ge_xSb_yTe_z$ wherein x, y and z are atomic percentages satisfying $45 \leq z \leq 55.5$, $0.5 \leq y/(x+y) \leq 0.72$ and $x+y+z=100$; the recording film having a thickness of 10 to 35 nm; the second dielectric film having a thickness of 5 to 40 nm; the reflecting film being made of one or an alloy of at least Au, Al, Ti, Cr and Ni and having a thickness of 35 nm or more; the optical information recording method comprising the steps of: converting each of a plurality of pulses contained in the digital signal, into a pulse train composed of a plurality of pulses; and modulating a laser power between an erasing level and a recording level by the pulse train and forming a recording mark on the optical disk by the pulse train so as to record the digital signal on the optical disk; the pulse train being composed of a leading pulse and a subsequent pulse train; the pulses of the subsequent pulse train having an identical width and being arranged at an identical interval; the leading pulse having, at all times irrespective of length of the recording mark, a fixed width larger than the width of each of the pulses of the subsequent pulse train; wherein when the recording mark has an n-th length (n=natural number), the number of the pulses in the subsequent pulse train is (n−1).

In the optical disk of the present invention, since the recording film having a small thickness is provided quite close to the metallic reflecting film, heat diffusion effect is great. Since the recording film is rapidly cooled after having been heated, heat accumulation in the recording film is lessened. In addition, when a laser beam is irradiated to the optical disk, the leading pulse having the large width is irradiated to the optical disk so as to heat the recording film sufficiently and then, the pulses of the subsequent pulse train are irradiated to the optical disk intermittently, heat accumulation in the recording film can be further reduced.

Namely, in the optical information recording method of the present invention, since heat accumulation in the recording film can be lessened greatly, distortion of the recording mark resulting from heat accumulation of the recording film also can be reduced drastically.

Furthermore, in the optical information recording method of the present invention, excellent erasure speed, recording sensitivity and repetition characteristics of recording and erasure can be achieved by specifying structure of the optical disk and composition of the recording film of the optical disk.

BRIEF DESCRIPTION OF THE DRAWINGS

This object and features of the present invention will become apparent from the following description taken in conjunction with the preferred embodiment thereof with reference to the accompanying drawings, in which:

FIG. 3 is a view showing examples of conversion of wave form of a recording signal in the optical information recording method of the present invention;

Before the description of the present invention proceeds, it is to be noted that like parts are designated by like reference numerals throughout several views of the accompanying drawings.

DETAILED DESCRIPTION OF THE INVENTION

Hereinbelow, an optical information recording method according to the present invention is described with reference to the accompanying drawings. As described earlier, in order to perform PWM recording in a phase change optical disk, it is necessary to reduce distortion of shape of a recording mark by restricting heat accumulation at the time of recording. In order to reduce distortion of shape of the recording mark, the present inventors have investigated structure of an optical disk and composition of a recording film of the optical disk and a recording method. As a result, the present inventors have found that distortion of shape of the recording mark can be reduced in the rewritable optical disk when signals are recorded, by using specific recording laser wave form, on an optical disk having specific structure and specific composition of the recording film. Simultaneous employment of this optical disk and this laser beam irradiating method reduces distortion of shape of the recording mark drastically and has proved quite effective for recording and reproducing an EFM (8-14 modulation) signal acting as CD standards.

Meanwhile, the optical information recording method of the present invention is especially effective when linear speed, i.e. relative speed between a laser spot and the optical disk is low. However, even when linear speed is as high as 10 m/sec., the optical information recording method of the present invention is also effective in reducing distortion of the recording mark.

Figure 1:
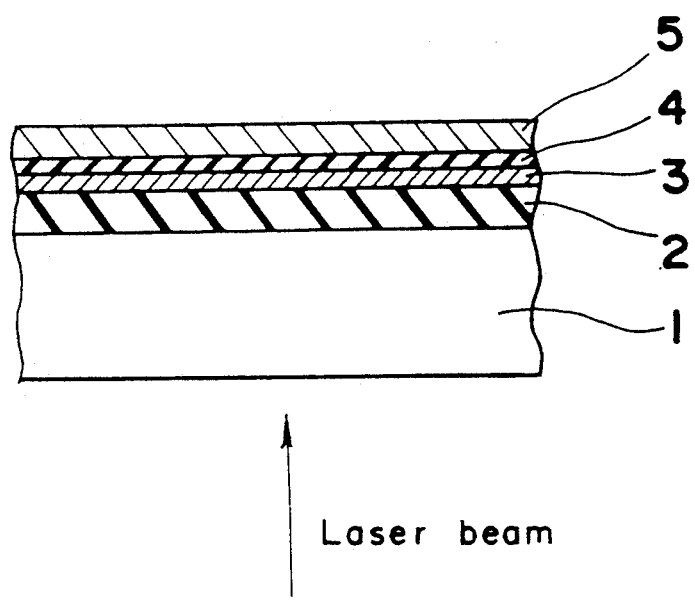
FIG. 1 is a sectional view of an optical disk employed in an optical information recording method according to the present invention.

Initially, an optical disk employed in the optical information recording method of the present invention is described. FIG. 1 shows structure of the optical disk of the present invention. In FIG. 1, a dielectric film 2, a recording film 3, a dielectric film 4 and a reflecting film 5 are stacked on a substrate 1 in this order. The substrate 1 may be made of metal, glass, resin, etc. However, since a laser beam is generally incident upon the optical disk from the substrate 1, the substrate 1 is made of transparent glass, quartz, polycarbonate, polymetyl methacrylate, etc. The optical disk of the present invention has the following features (1) to (3).

Figure 2:
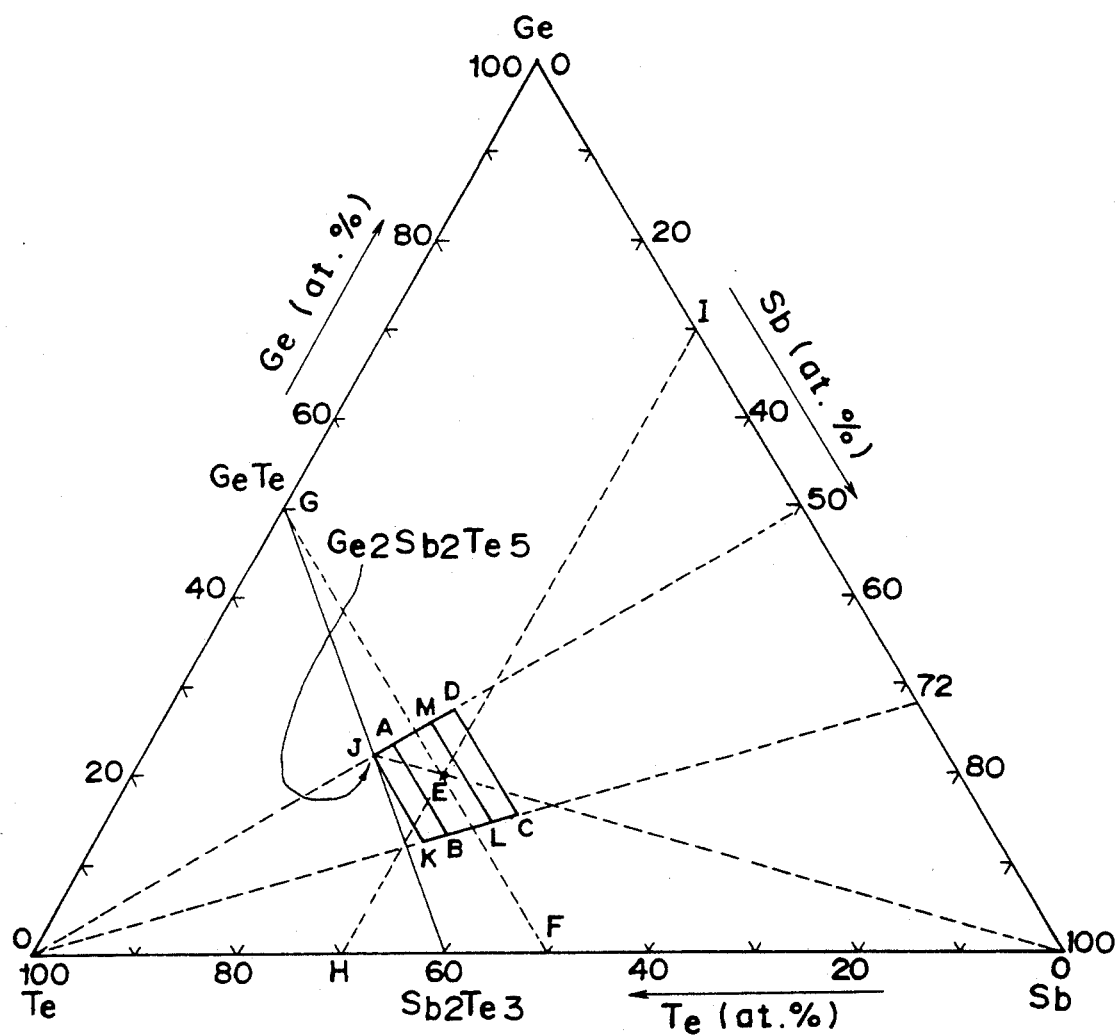
FIG. 2 is a composition diagram showing a range of composition of a recording film of the optical disk of FIG. 1.

(1) Composition of the recording film 3 is so defined as to fall in a region JKCD enclosed by points J, K, C and D of FIG. 2 and the recording film 3 has a thickness of 10–35 nm. FIG. 2 is a composition diagram of equilateral triangle having compositions Ge, Sb and Te of the recording film 3 set at its vertexes, respectively.

(2) The dielectric film 4 has a thickness of 5–40 nm.

(3) The reflecting film 5 is made of one or an alloy of at least Au, Al, Ti, Ni and Cr and has a thickness of 35 nm or more.

Coordinates (Ge, Sb, Te) of the points J, K, C and D expressed in atomic % in FIG. 2 are as follows:
J (22.5, 22, 55.5), K (12.5, 32, 55.5),
C (15.5, 39.5, 45) and D (27.5, 27.5, 45).

The region JKCD is expressed by a formula $Ge_xSb_yTe_z$ wherein x, y and z are atomic percentages satisfying $45 \leq z \leq 55.5$, $0.5 \leq y/(x+y) \leq 0.72$ and $x+y+z=100$.

In such optical disk, since the thin recording film 3 is disposed quite adjacent to the metallic reflecting film 5, heat diffusion effect is great. Therefore, the recording film 3 is rapidly cooled after having been heated. Accordingly, quantity of heat accumulated in the recording film 3 is reduced. Accordingly, even at low linear speed, distortion of shape of the recording mark can be restricted. Furthermore, excellent erasure speed, recording sensitivity and repetition characteristics of recording and erasure can be obtained by designating composition of the recording film 3 as described above.

Grounds for defining the constituent elements of the optical disk as described above are described, hereinbelow. Initially, composition of the recording film 3 is so defined as to fall in the region JKCD on the following ground. Namely, when composition of the recording film 3 is changed while maintaining the above mentioned structure of the optical disk, crystallizing speed is too high in an area in which Te is present in an amount larger than the line J-K. Therefore, in the region, crystallization is likely to take place even after fusion of the recording film 3 and thus, shape of the amorphous recording mark is distorted. On the contrary, in an area in which Te is present in an amount smaller than the line C-D, crystallizing speed is too slow, so that the amorphous portion is not sufficiently crystallized and thus, a large portion is left unerased. In both the above cases, jitter increases.

Meanwhile, in an area in which Ge is present in an amount smaller than the line K-C and an area in which Ge is present in an amount larger than the line D-J, repetition characteristics of recording and erasure is poor. Consequently, in structure of the optical disk in which the heat accumulation phenomenon is minimized, composition of the recording film 3 should fall in the region JKCD.

More specifically, in the case of the phase change optical disk, crystallizing speed required of the recording film also varies when linear speed varies. When linear speed is low, a period during which a laser spot passes through an arbitrary point on the optical disk becomes long and thus, even a recording film having relatively low crystallizing speed can be used. However, when linear speed is high, a period during which a laser spot passes through an arbitrary point on the optical disk becomes short and thus, the recording film is required to have relatively high crystallizing speed. Meanwhile, as linear speed becomes higher, distortion of the recording mark is reduced further and thus, a recording film having higher crystallizing speed can be used.

From a viewpoint of erasure speed, recording sensitivity and repetition characteristics of recording and erasure, excellent compositions of the recording film 3 of the optical disk employed in the present invention fall in a region ABCD enclosed by points A, B, C and D in FIG. 2 and a region JKLM enclosed by points J, K, L and M in FIG. 2 when linear speed is 1.2–1.4 m/sec. and 8–13 m/sec., respectively.

The region ABCD is expressed by a formula $Ge_xSb_yTe_z$ in which x, y and z are atomic percentages satisfying $45 \leq z \leq 53$, $0.5 \leq y/(x+y) \leq 0.72$ and $x+y+z=100$, while the region JKLM is expressed by a formula $Ge_xSb_yTe_z$ in which x, y and z are atomic percentages satisfying $48 \leq z \leq 55.5$, $0.5 \leq y/(x+y) \leq 0.72$ and $x+y+z=100$.

Meanwhile, an overlap region ABLM between the region ABCD and the region JKLM, which is enclosed by the points A, B, L and M, can be used at a linear speed of 1.2 to 13 m/sec. by combination of recording wave form of the present invention and therefore, can be applied to a wide range of optical disks such as a rewritable compact disk (CD), a data file, a moving picture file, etc.

Coordinates (Ge, Sb, Te) of the points A, B, L and M expressed in atomic % are as follows:
A (23.5, 23.5, 53), B (13, 34, 53),
L (14.5, 37.5, 48) and M (26, 26, 48).

The region ABLM is expressed by a formula $Ge_xSb_yTe_z$ in which x, y and z are atomic percentages satisfying $48 \leq z \leq 53$, $0.5 \leq y/(x+y) \leq 0.72$ and $x+y+z=100$.

Meanwhile, if only thickness of the recording film 3 is changed in the optical disk of the above described structure, not only absorption of the laser beam by the recording film 3 is poor but recording sensitivity deteriorates due to great heat diffusion effect when the recording film 3 has a thickness of less than 10 nm. On the other hand, when thickness of the recording film 3 exceeds 35 nm, thermal capacity of the recording film 3 becomes large and distortion of shape of the recording mark due to the heat accumulation phenomenon is increased. Therefore, the recording film 3 preferably has a thickness of 10–35 nm.

Similarly, thickness of the dielectric film 4 adjacent to the reflecting film 5 has been investigated. As a result, when the dielectric film 4 has a thickness of less than 5 nm, the recording film 3 is disposed too close to the reflecting film 5, so that the heat diffusion effect becomes excessively great, thereby resulting in deterioration of recording sensitivity. On the other hand, when thickness of the dielectric film 4 exceeds 40 nm, heat diffusion of the recording film 3 to the recording film 5 is reduced and thus, distortion of shape of the recording mark due to the heat accumulation phenomenon becomes large. Therefore, it is desirable that the dielectric film 4 has a thickness of 5–40 nm. Meanwhile, the dielectric films 2 and 4 may be made of one or a mixture of $SiO_2$, SiO, $Al_2O_3$, $GeO_2$, $TeO_2$, $MoO_3$, $WO_3$, $Ta_2O_5$, $Si_3N_4$, AlN, BN, TiN, ZnS, ZnSe, ZnTe and SiC. However, it is preferable that material of the dielectric films 2 and 4 has excellent thermal stability and facilitates formation of the dielectric films 2 and 4. To this end, the dielectric films 2 and 4 are desirably made of at least one of ZnS, $SiO_2$, $Ta_2O_5$, $Si_3N_4$, AlN, TiN and ZnSe, a mixture of ZnS and $SiO_2$ or a mixture of ZnSe and $SiO_2$.

Furthermore, thickness of the reflecting film 5 has been investigated. As a result, when the reflecting film 5 has a thickness of less than 35 nm, the heat diffusion effect of the reflecting film 5 is lessened and thus, distortion of shape of the recording mark due to the heat accumulation effect is increased. Therefore, the recording film 5 preferably has a thickness of 35 nm or more. It is desirable that composition of the reflecting film 5 has a large reflectance, has high thermal conductivity and facilitates formation of the reflecting film 5. To this end, the reflecting film 5 is preferably made of one or an alloy of at least Au, Al, Ti, Ni and Cr.

Then, an irradiation method of a recording laser beam is described. Assuming that character T denotes a clock period, the EFM signal acting as CD standards is constituted by different pulses having 9 kinds of pulse widths of 3T to 11T. In a conventional recording method based on single beam overwriting, laser power is directly modulated between erasing level and recording level by the EFM signal such that signals are recorded on the optical disk. However, in this conventional recording method, the recording mark is greatly distorted into a teardrop-shape. Thus, the present inventors previously proposed in the earlier mentioned U.S. Patent Application, a recording method which lessens distortion of the recording mark. In this known recording method, at the time of single beam overwriting, a recording pulse forming one recording mark is converted into a pulse train constituted by a plurality of short pulses of specific shape such that signals are recorded. Hereinbelow, this known recording method is referred to as a "multi-pulse (MP) recording method". The recording method of the present invention is obtained by extracting from the multi-pulse recording method, elements especially effective for the optical disk of the present invention and defining the elements.

Namely, in the recording method of the present invention, each of pulses contained in a digital signal is initially converted into a pulse train constituted by a plurality of pulses. Then, laser power is modulated between erasing level and recording level by the pulse train. When one recording mark is formed on the optical disk by each pulse train so as to record the digital signal, the pulse train is constituted by a leading pulse and a subsequent pulse train. Width of the leading pulse is fixed at all times and is larger than that of each of the pulses in the subsequent pulse train. Furthermore, the pulses in the subsequent pulse train have an identical width and an identical interval. In the case where the recording mark having n-th length (n=natural number) is formed, the number of the pulses in the subsequent pulse train is (n−1).

Figures 4A, 4B, 4C, 4D:
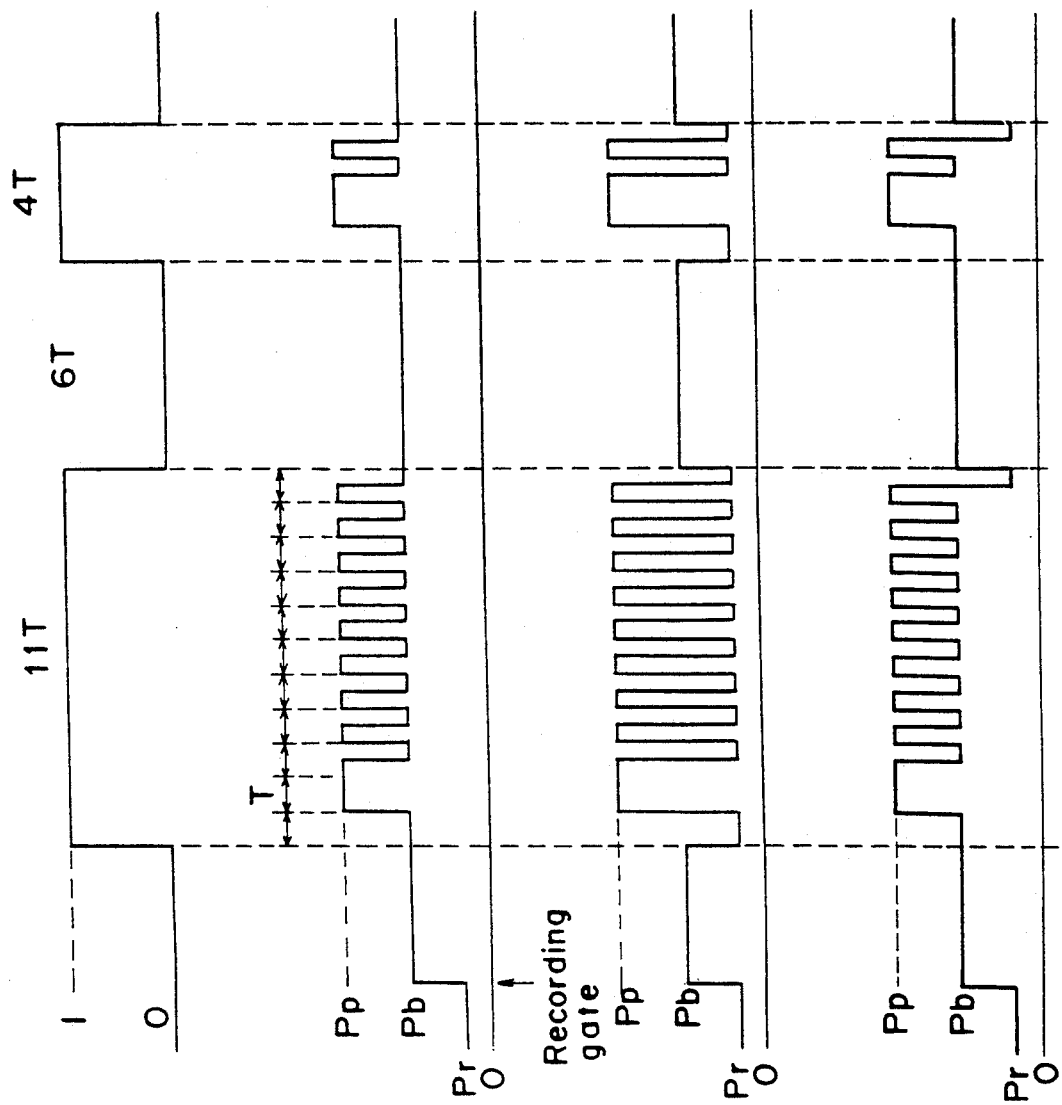
FIG. 4a is a view showing input signal and FIGS. 4b to 4d are views showing wave forms of laser output in the optical information recording method of the present invention.

In 9 kinds of the pulses contained in the EFM signal and having different widths of 3T to 11T as shown in FIG. 3, the pulse having the width of 3T is converted into a pulse train formed by a leading pulse having a large width. Meanwhile, the pulse having the width of 4T is converted into a pulse train in which the subsequent pulse train formed by one narrow pulse is added to the leading pulse and the pulse having the width of 5T is converted into a pulse train in which the subsequent pulse train formed by the two narrow pulses are added to the leading pulse. Likewise, the pulse having the width of 11T is converted into a pulse train in which the subsequent pulse train formed by the eight narrow pulses are added to the leading pulse. In order to record signals by modulating laser power between recording level and erasing level by these pulse trains, wave form of an input signal as shown in FIG. 4a is irradiated onto the optical disk by laser output shown in FIG. 4b such that a new signal is recorded on the optical disk while a signal recorded preliminarily on the optical disk is being erased. In order to modulate laser power, it may also be possible to employ a method shown in FIG. 4c in which laser power is modulated between a recording level Pp and a reproducing level Pr or an OFF level only during a period of the pulse train. Alternatively, as shown in FIG. 4d, laser power may be lowered to the reproducing level Pr or the OFF level during a predetermined period following the subsequent pulse train. In the case where gap between the recording marks is small, heat of the rear end of one recording mark is transferred to a location for recording the next recording mark so as to preheat the location, so that the recording marks become large in size. However, if modulation is performed as shown in FIG. 4c or 4d, ratio of heat transfer from the rear end of one recording mark to the location for recording the next recording mark can be reduced and thus, thermal interference between the recording marks can be prevented.

Hereinbelow, concrete examples 1-14 of the present invention are described.

EXAMPLE 1

Initially, effectiveness of the optical disk and the optical information recording method according to the present invention is shown in comparison with the prior art. To this end, an optical disk A of the present invention and a known optical disk B are prepared. After an EFM signal has been recorded on the optical disk A and the prior art optical disk B by the recording laser beam irradiating method of the present invention and the known recording laser beam irradiating method, the EFM signal is reproduced and jitter of the reproduced signal is compared between the present invention and the prior art.

The optical disk A has structure shown in FIG. 1. The substrate 1 which is preliminarily provided with recording tracks has a diameter of 120 mm and is made of polycarbonate. The recording film 3 has a composition of $Ge_{20}Sb_{30}Te_{50}$ expressed in atomic % and has a thickness of 20 nm. The dielectric films 2 and 4 are formed by mixture of ZnS and 20 mol % of $SiO_2$ and have thicknesses of 150 nm and 12 nm, respectively. The reflecting film 5 is made of Au and has a thickness of 50 nm. In this example, in order to protect these thin films, a protective cover made of polycarbonate is bonded to the optical disk A. Relative speed between the optical disk and laser spot, i.e. linear speed is fixed at 1.25 m/sec.

Figure 17:
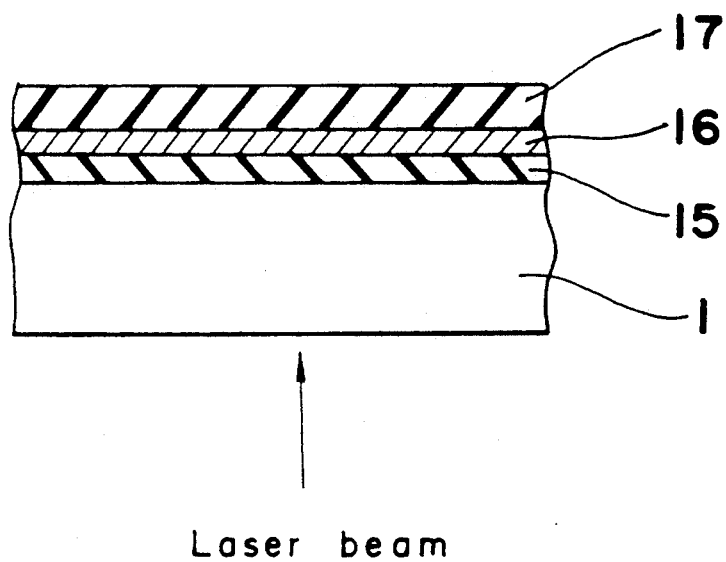
FIG. 17 is a sectional view of the prior art optical disk of FIG. 16 (already referred to)
Figures 18A, 18B, 18C:
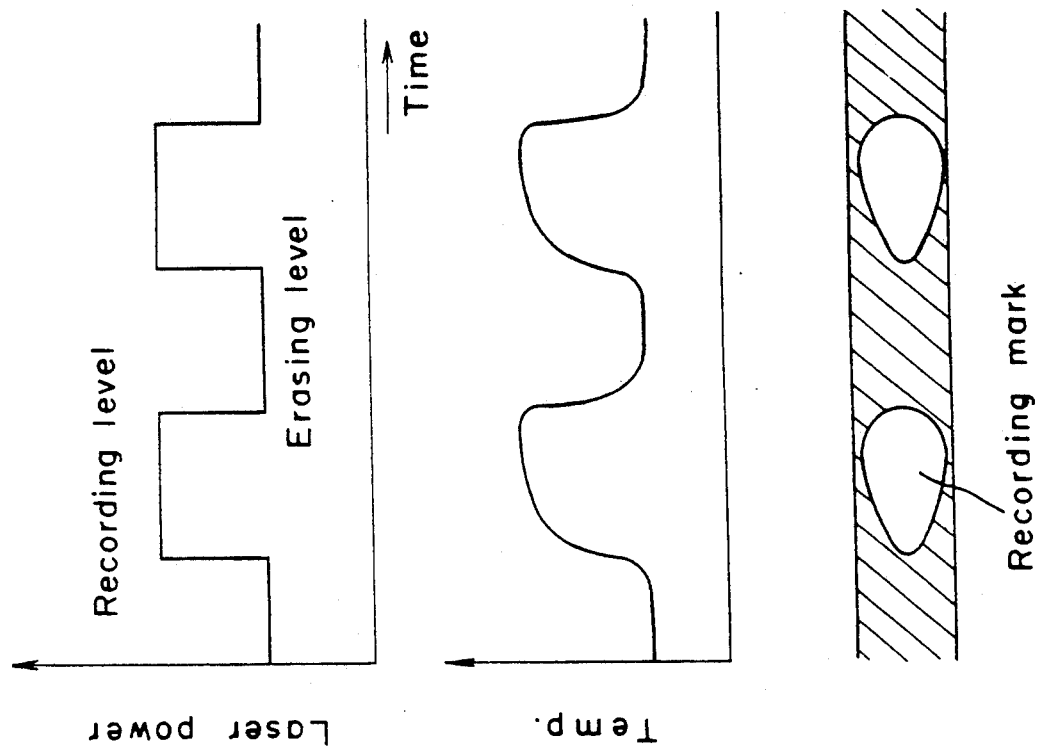
FIGS. 18a to 18c are views explanatory of a cause of distortion of shape of a recording mark in the prior art optical disk of FIG. 17 (already referred to).

On the other hand, the known optical disk B has structure shown in FIG. 17. Compositions of the substrate 1, the recording film 16 and the dielectric films 15 and 17 are the same as those of the optical disk A. The dielectric film 15 has a thickness of 100 nm, while the dielectric film 17 has a thickness of 200 nm. The recording film 16 has a thickness of 100 nm. In order to protect also the optical disk B, a protective cover made of polycarbonate is bonded to the optical disk B.

Figures 5A, 5B:
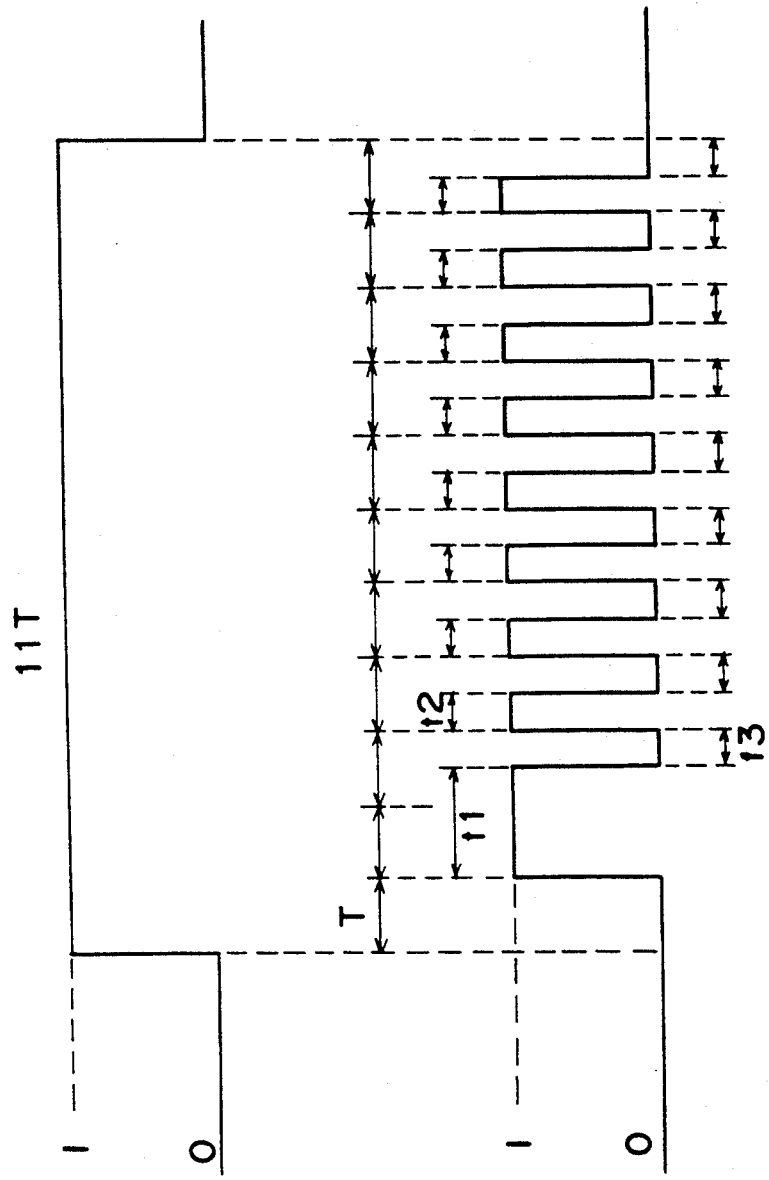
FIGS. 5a and 5b are views explanatory of conversion of wave form of a recording signal in the optical information recording method of the present invention.

For irradiating a recording laser beam, the known recording method in which power modulation of the laser beam is directly performed between recording level and erasing level by the EFM signal and the multi-pulse (MP) recording method in which after conversion of the EFM signal into the pulse trains according to the present invention, the laser beam is modulated are employed. In the MP recording method, since the input pulses having the widths of 3T to 11T are converted into the pulse trains by a predetermined rule, it becomes possible to determine all the pulse trains from a width t1 of the leading pulse and a width t2 of each of the pulses of the subsequent pulse train as shown in FIG. 5b. Namely, when wave form of the input pulse having the width of 11T shown in FIG. 5a is converted into the pulse train as shown in FIG. 5b, all the pulse trains corresponding to the input pulses having the widths of 3T to 11T, respectively can be determined from the width t1 of the leading pulse and the width t2 of the pulses of the subsequent pulse train since an interval t3 between the leading pulse and a foremost one of the pulses of the subsequent pulse train or between neighboring ones of the pulses of the subsequent pulse train is obtained from the equation: $t3 = T - t2$.

Figure 6:
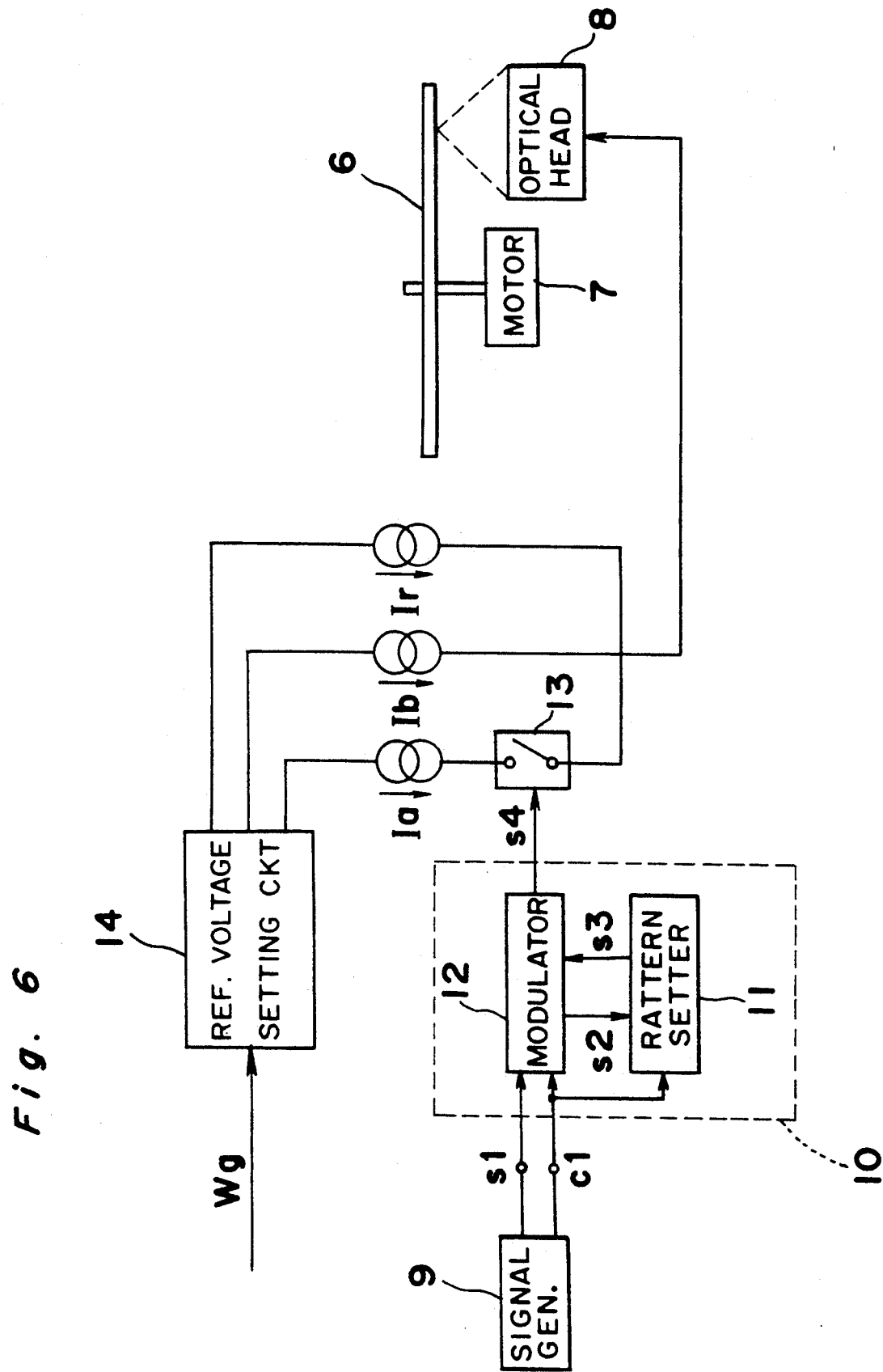
FIG. 6 is a schematic view showing one example of a recording apparatus employed in the optical information recording method of the present invention.

FIG. 6 shows a recording apparatus for obtaining wave form of FIG. 4b, according to the present invention. In FIG. 6, an optical disk 6 is rotated by a spindle motor 7 at a fixed relative speed between a laser spot from an optical head 8 and the optical disk 6, i.e. at a fixed linear speed of 1.25 m/sec. When signals are recorded on the optical disk 6, an EFM signal from a signal generator 9 is converted into a pulse train signal s4 by a multi-pulse (MP) circuit 10. The MP circuit 10 includes a pattern setter 11 and a modulator 12. In the pattern setter 11, a pattern of the pulse train corresponding to the pulse having the largest width of 11T is set in advance. The modulator 12 detects a pulse width of the EFM signal s1 and fetches a necessary length from the head of the set pattern of the pattern setter 11 in accordance with the detected pulse width so as to generate and output a pulse train. In order to prevent an edge position of the input signal from the signal generator 9 from being displaced through modulation of the input signal into the pulse train, the signal generator 9, the modulator 12 and the pattern setter 11 are synchronized by an identical clock C1 such that jitter of the reproduced signals is restricted.

Meanwhile, at the time of reproduction of the signal, current Ir flows through a semiconductor laser in the optical head 8 so as to obtain the reproducing level Pr. However, during recording of the signal, namely at the time of input of a recording gate signal Wg, bias current Ib flows through the semiconductor laser in the optical head 8 so as to obtain an erasing level Pb and further, current Ia for obtaining the recording level Pp flows therethrough additionally when a switch 13 has been actuated by the pulse train signal s4. Therefore, at the time of recording of the signal, laser power is modulated between the erasing level Pb and the recording level Pp on the basis of wave form of the pulse train. A reference voltage setting circuit 14 is provided for generating a voltage necessary for obtaining the currents Ir, Ia and Ib. Furthermore, the semiconductor laser in the optical head 8 has a wavelength of 830 nm and an objective lens of the optical head 8 has a numerical aperture (NA) of 0.5.

In this example, the pulse train of FIG. 5b has the width t1 of 348 nsec., the width t2 of 116 nsec. and the clock period T of 232 nsec. Meanwhile, in the prior art recording method, laser power is modulated by directly actuating the switch 13 by the EFM signal s1. In combinations of the optical disk A of the present invention, the known optical disk B, the multi-pulse recording method of the present invention and the known recording method, a signal overwritten 10 times on an identical recording track is reproduced and magnitude of jitter of the reproduced signal is measured by using a compact disk jitter meter "MJM-631" (name used in trade and manufactured by Meguro Electric Co., Ltd. of Japan).

Table 1 below shows results of the measurement. Each of values of jitter indicated in Table 1 is a minimum jitter obtained by changing the erasing level Pb and the recording level Pp in the combination of the optical disk and the recording method. The laser powers Pb and Pp yielding the minimum jitter are also shown in Table 1. The laser powers Pb and Pp are values measured on the surface of the optical disk. As will be seen from Table 1, jitter is quite large in the combination of the known optical disk B and the known recording method. However, in the combination of the known optical disk B and the multi-pulse (MP) recording method of the present invention and the combination of the optical disk A of the present invention and the known recording method, jitter is considerably reduced. Furthermore, in the combination of the optical disk A of the present invention and the multi-pulse recording method of the present invention, jitter is remarkably reduced. Therefore, in order to reduce jitter, it is of deep significance to simultaneously employ the optical disk A of the present invention and the multi-pulse recording method of the present invention.

TABLE 1

| Optical disk | Recording method | Jitter (nsec.) | Laser power Pb(mW) | Pp(mW) |
| --- | --- | --- | --- | --- |
| B | Prior art | 80 | 4.5 | 7.2 |
| B | MP | 44 | 4.5 | 8.5 |
| A | Prior art | 48 | 6.5 | 12.0 |
| A | MP | 20 | 6.5 | 14.0 |

Hereinbelow, the examples in which structure of the optical disk is further defined are described in detail. As is seen from Table 1, jitter is made smaller in the MP recording method than in the known recording method when the laser beam is irradiated. Therefore, in the following examples 2-7, the MP recording method having the same wave form as the example 1 is employed.

EXAMPLE 2

In this example, composition of the recording film 3 is so defined as to fall in the region ABCD of FIG. 2 when linear speed is in the vicinity of 1.25 m/sec. The present inventors previously disclosed in "JJAP, Vol. 26 (1987) Suppl. 26-4, p61-66" that in GeSbTe alloy, three kinds of compounds which crystallize at high speed from amorphous state, i.e. $GeSb_4Te_7$, $GeSb_2Te_4$ and $Ge_2Sb_2Te_5$ exist on a line connecting GeTe and $Sb_2Te_3$ and these compounds have excellent recording and erasing characteristics and excellent repetition characteristics. But, crystallizing speed of the recording film becomes lower as the compositions are farther away from the line connecting GeTe and $Sb_2Te_3$. Since crystallizing speed on the line connecting GeTe and $Sb_2Te_3$ is too high for the linear speed of the compact disk, it is difficult to convert the recording film into amorphous state.

Therefore, the present inventors have attempted to lower crystallizing speed of the recording film by adding Sb to $Ge_2Sb_2Te_5$. By making structure of the optical disk identical with that of the optical disk A of the example 1, only composition of the recording film is changed on a line connecting $Ge_2Sb_2Te_5$ and Sb. Jitter of the thus manufactured optical disk is measured in a method similar to that of the example 1.

Characteristics required of the phase change optical disk include repetition characteristics of recording and erasure. In order to evaluate repetition characteristics of recording and erasure, jitter is measured by repeatedly recording the EFM signal at the recording level Pp and the erasing level Pb where jitter is minimized and then, the number of repetition of recording, at which jitter assumes twice an initial value, is obtained.

Figure 7:
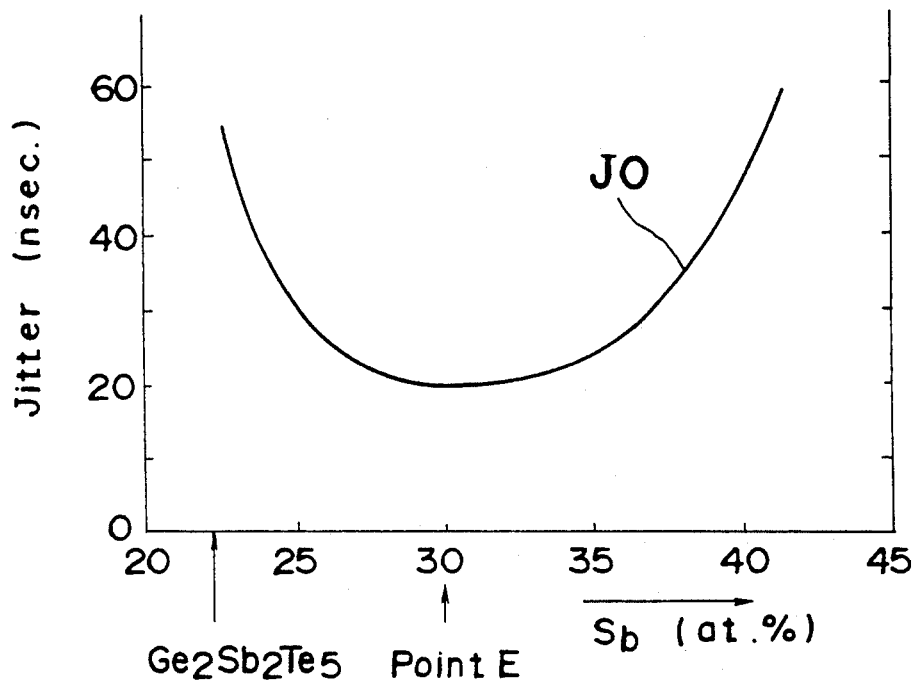
FIGS. 7 and 13 are graphs showing relation between composition of a recording film of the optical disk of FIG. 1 having quantity of Sb as a parameter and jitter characteristics of reproduced wave form.

FIG. 7 shows results of the measurement. In FIG. 7, jitter J0 shows a minimum value obtained by changing the recording level Pp and the erasing level Pb. Jitter J0 of reproduced signals assumes a minimum in the vicinity of 30 atomic % of Sb, i.e. the point E in FIG. 2. If quantity of Sb is made smaller than the point E, crystallizing speed becomes high and thus, shape of the recording mark is distorted. On the other hand, when quantity of Sb is made larger than the point E, crystallizing speed becomes low, so that erasure ratio deteriorates and thus, recording is adversely affected by the previously recorded signals. Thus, in both of the cases, jitter is increased. In view of compact disk standards, it is preferable that jitter is not more than 30 nsec. This corresponds to quantity of Sb ranging from 25 to 37 atomic %.

The repetition characteristics test is performed 100,000 times for the optical disk having the initial jitter J0 of not more than 30 nsec. such that the number C2 of repetition of recording, at which jitter assumes twice the initial value, is obtained. On the line connecting $Ge_2Sb_2Te_5$ and Sb in FIG. 2, such a phenomenon does not take place in which jitter increases to twice the initial value even after repeating recording 100,000 times.

From the above, it is concluded that composition of the recording film, which falls on the line connecting $Ge_2Sb_2Te_5$ and Sb and is suitable for heat diffusion and the recording method of the present invention, is 25-37 atomic % of Sb.

EXAMPLE 3

In this example, the recording film is prepared by fixing quantity of Te at 50 atomic % and changing ratio of Ge and Sb on the line connecting points F and G in FIG. 2 so as to produce the optical disk and then, signals are recorded in the same method as the example 2 such that jitter and repetition characteristics are measured. Structure of the optical disk is the same as the example 2.

Figure 8:
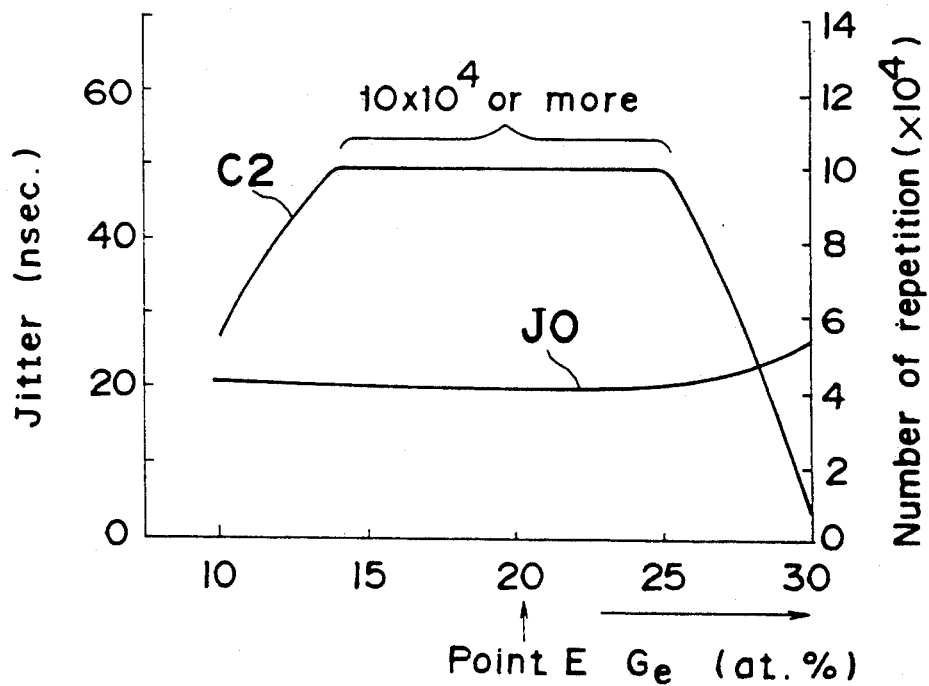
FIGS. 8 and 14 are graphs showing relation between composition of the recording film of the optical disk of FIG. 1 having a fixed quantity of Te and jitter characteristics of reproduced wave form.

FIG. 8 shows results of the measurement. Even if quantity of Ge is changed, the initial jitter J0 is not more than 30 nsec., which is excellent.

Meanwhile, when quantity of Ge ranges from 14 to 25 atomic %, jitter does not increase to twice the initial value after repeating recording 100,000 times for repetition characteristics. However, in an area in which quantity of Ge is smaller than that of this range or in an area in which quantity of Ge is larger than that of this range, the number C2 of repetition of recording becomes less than 100,000 and thus, jitter increases to twice the initial value by repeating recording less than 100,000 times.

From the above, it is concluded that composition of the recording film suitable for the structure of the optical disk and the recording laser beam irradiating method of the present invention is 14-25 atomic % of Ge when quantity of Te is fixed at 50 atomic %.

EXAMPLE 4

In this example, the recording film is prepared by fixing quantity of Sb at 30 atomic % and changing ratio of Ge and Te on the line connecting points H and I in FIG. 2 so as to produce the optical disk and then, signals are recorded in the same method as the example 2 such that jitter and repetition characteristics are measured. Structure of the optical disk is the same as the example 2.

Figure 9:
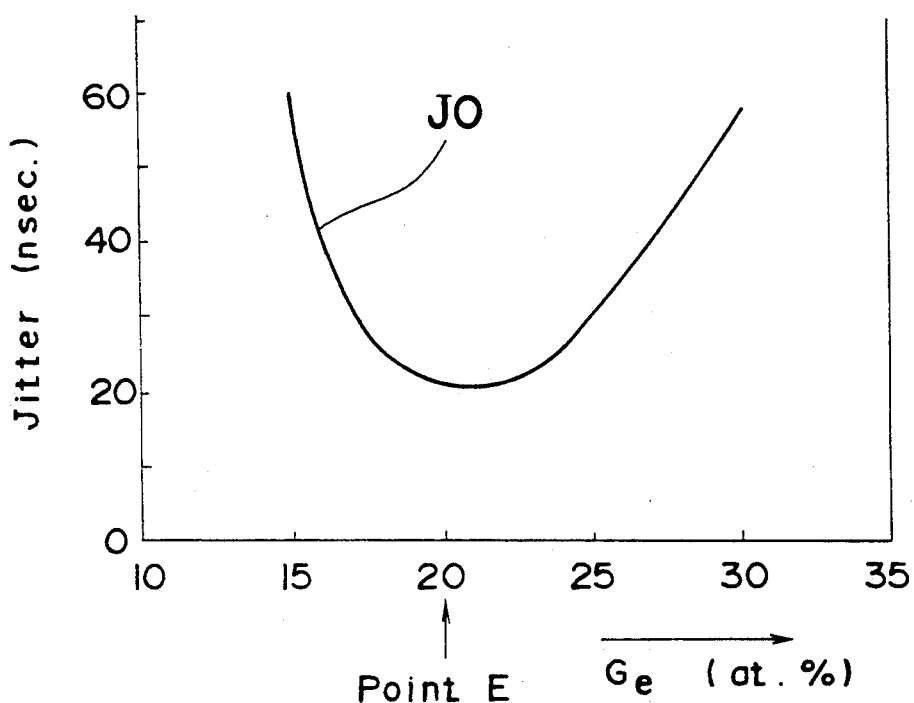
FIGS. 9 and 15 are graphs showing relating between composition of the recording film of the optical disk of FIG. 1 having a fixed quantity of Sb and jitter characteristics of reproduced wave form.

FIG. 9 shows results of the measurement. Initial jitter J0 of reproduced signals assumes a minimum in the vicinity of 20 atomic % of Ge, i.e. the point E of FIG. 2. If quantity of Ge is made smaller than the point E, crystallizing speed becomes high and thus, shape of the recording mark is distorted. On the other hand, if quantity of Ge is made larger than the point E, crystallizing speed becomes low, so that the erasure ratio deteriorates and thus, recording is adversely affected by the previously recorded signals. Thus, in both of the cases, jitter is increased. An area in which jitter is not more than 30 nsec. corresponds to quantity of Ge ranging from 17 to 25 atomic % when quantity of Sb is fixed at 30 atomic %.

The repetition characteristics test is performed 100,000 times for the optical disk having the initial jitter J0 of not more than 30 nsec. such that the number C2 of repetition of recording, at which jitter assumes twice the initial value, is obtained. In the optical disk including the recording film in which quantity of Sb is fixed at 30 atomic % and quantity of Ge is changed in the range of 17 to 25 atomic %, jitter does not increase to twice the initial value even after repeating recording 100,000 times.

From the above, it is concluded that composition of the recording film suitable for the structure of the optical disk and the recording laser beam irradiating method of the present invention is 17-25 atomic % of Ge when quantity of Sb is fixed at 30 atomic %.

From the above examples 2-4, when linear speed is as low as 1.25 m/sec., composition of the recording film of GeSbTe alloy suitable for the structure of the optical disk and the recording method of the present invention falls in the region ABCD enclosed by the points A, B, C and D in FIG. 2, namely a region $Ge_xSb_yTe_z$ in which x, y and z are atomic percentages satisfying $45 \leq z \leq 53$, $0.5 \leq y/(x+y) \leq 0.72$ and $x+y+z=100$. Coordinates (Ge, Sb, Te) of the points A, B, C and D expressed in atomic % are as follows:

A (23,5, 23.5, 53), B (13, 34, 53),
C (15,5, 39.5, 45) and D (27.5, 27.5, 45).

EXAMPLE 5

In this example, thickness of the recording film is determined. Structure of the optical disk and composition of the recording film are made identical with those of the optical disk A of the example 1 and only thickness of the recording film is changed. Then, signals are recorded in a recording method similar to that of the example 2 such that jitter of the reproduced signals and recording sensitivity of the optical disk are measured.

Figure 10:
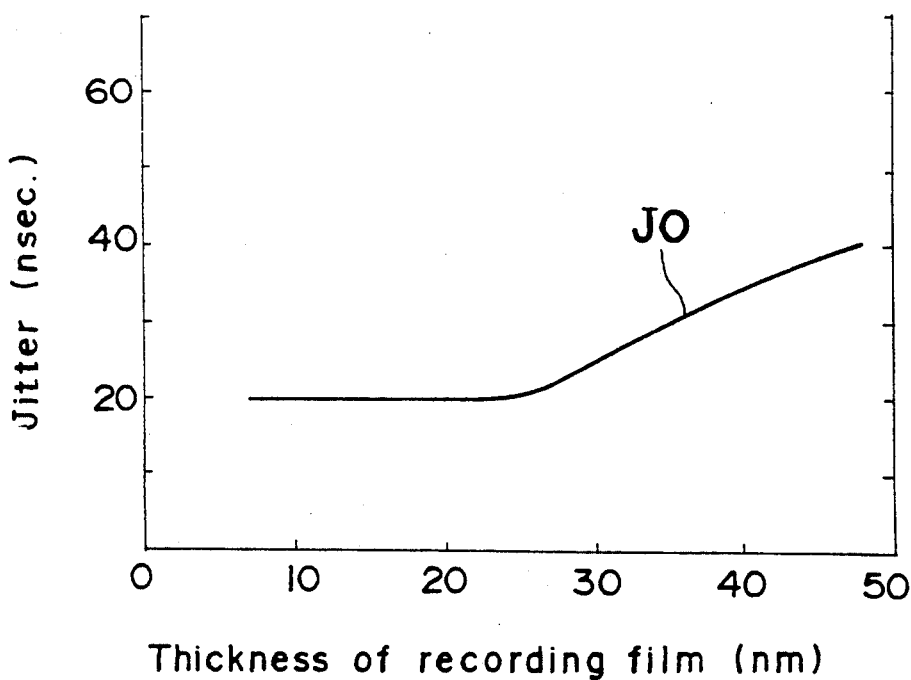
FIG. 10 is a graph showing relation between thickness of the recording film of the optical disk of FIG. 1 and jitter characteristics of reproduced wave form.

FIG. 10 shows results of the measurement. The jitter J0 measured immediately after recording is fixed at a minute value of about 20 nsec. when thickness of the recording film is not more than 25 nm. However, when thickness of the recording film exceeds 25 nm, jitter is increased. Thus, when thickness of the recording film is 35 nm or more, jitter exceeds 30 nsec. This phenomenon may take place because heat accumulation is caused by increase of heat capacity of the recording film and thus, distortion of shape of the recording mark is increased. Hence, from a viewpoint of jitter, it is preferable that thickness of the recording film is not more than 35 nm, especially not more than 25 nm.

However, when thickness of the recording film is reduced, absorption of the laser beam by the recording film deteriorates and heat diffusion effect is enhanced, thereby resulting in drop of recording sensitivity. Semiconductor lasers acting as light sources for optical disks, which are commercially available at present, have an output of about 40-50 mW and will have an output of about 20 mW on the surface of the optical disk in view of transmission efficiency of the optical system. Therefore, it is desirable that the recording level Pp of the laser beam is not more than 20 mW. In the structure of the optical disk in this example, when thickness of the recording film is made smaller than 10 nm, the recording level Pp exceeds 20 mW due to drop of recording sensitivity. Namely, from a standpoint of recording sensitivity, thickness of the recording film is not less than 10 nm.

Namely, from a standpoint of both jitter and recording sensitivity, thickness of the recording film of GeSbTe alloy suitable for heat diffusion and the recording method of the present invention should range from 10 to 35 nm, preferably from 10 to 25 nm.

Meanwhile, dependence of repetition characteristics upon thickness of the recording film does not appear when thickness of the recording film ranges from 10 to 35 nm. Furthermore, jitter does not increase to twice the initial value even after repeating recording 100,000 times.

EXAMPLE 6

In this example, range of thickness of the dielectric film 4 adjacent to the reflecting film 5 is determined. Structure of the optical disk and composition of the recording film are made identical with those of the optical disk A of the example 1 and only thickness of the dielectric film 4 is changed. Then, signals are recorded in a recording method similar to that of the example 2 such that jitter of the reproduced signals and recording sensitivity of the optical disk are measured.

Figure 11:
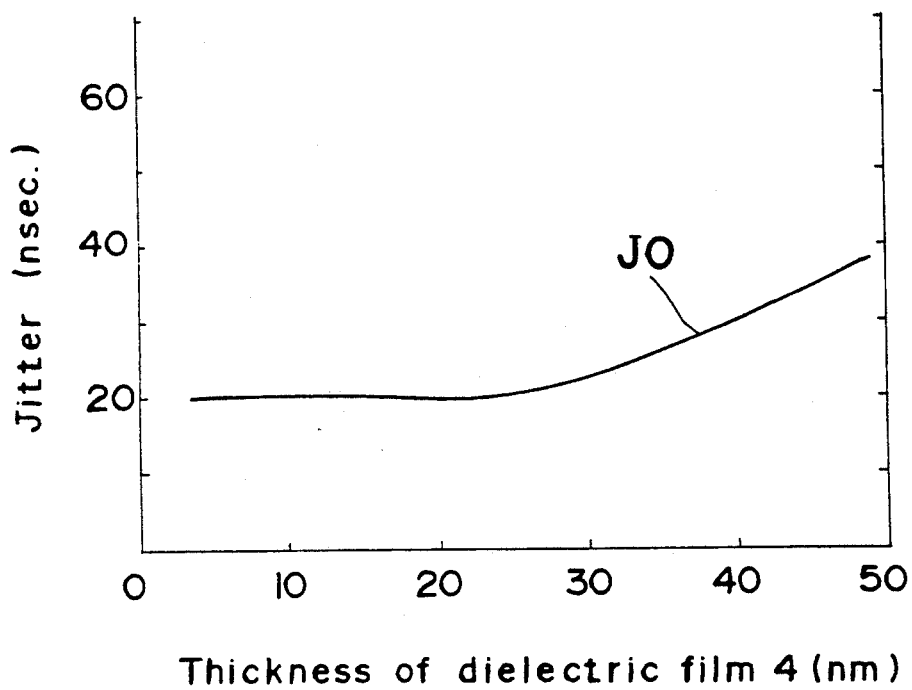
FIG. 11 is a graph showing relation between thickness of a dielectric film adjacent to a reflecting film in the optical disk of FIG. 1 and jitter characteristics of reproduced wave form.

FIG. 11 shows results of measurement. The jitter J0 is fixed at a minute value of about 20 nsec. when thickness of the dielectric film 4 is not more than 25 nm. However, when thickness of the dielectric film 4 exceeds 25 nm, the jitter J0 is increased. Thus, when thickness of the dielectric film 4 exceeds 40 nm, the jitter J0 exceeds 30 nsec. This phenomenon may take place because heat accumulation is caused by decrease of heat diffusion from the recording film to the reflecting film 5 and thus, distortion of shape of the recording mark is increased. Therefore, from a viewpoint of jitter, thickness of the dielectric film 4 adjacent to the reflecting film 5 should be not more than 40 nm, preferably not more than 25 nm.

However, if thickness of the dielectric film 4 is reduced excessively, the recording film is disposed close to the reflecting film 5 exceedingly. As a result, since heat diffusion effect becomes too conspicuous, recording sensitivity drops. In this example, when thickness of the dielectric film 4 is made smaller than 5 nm, the recording level Pp exceeds 20 mW due to drop of recording sensitivity. Namely, from a standpoint of recording sensitivity, it is preferable that thickness of the dielectric film 4 is not less than 5 nm.

Namely, from a viewpoint of both jitter and recording sensitivity, thickness of the dielectric film 4 suitable for heat diffusion and the recording method of the present invention should range from 5 to 40 nm, preferably from 5 to 25 nm.

Meanwhile, dependence of repetition characteristics upon thickness of the dielectric film 4 does not appear when thickness of the dielectric film 4 ranges from 5 to 40 nm. Furthermore, jitter does not increase to twice the initial value even after repeating recording 100,000 times.

EXAMPLE 7

In this example, range of thickness of the reflecting film 5 is determined. Structure of the optical disk and composition of the recording film are made identical with those of the optical disk A of the example 1 and only thickness of the reflecting film 5 made of Au is changed. Then, signals are recorded in a recording method similar to that of the example 2 such that jitter of the reproduced signals and recording sensitivity of the optical disk are measured.

Figure 12:
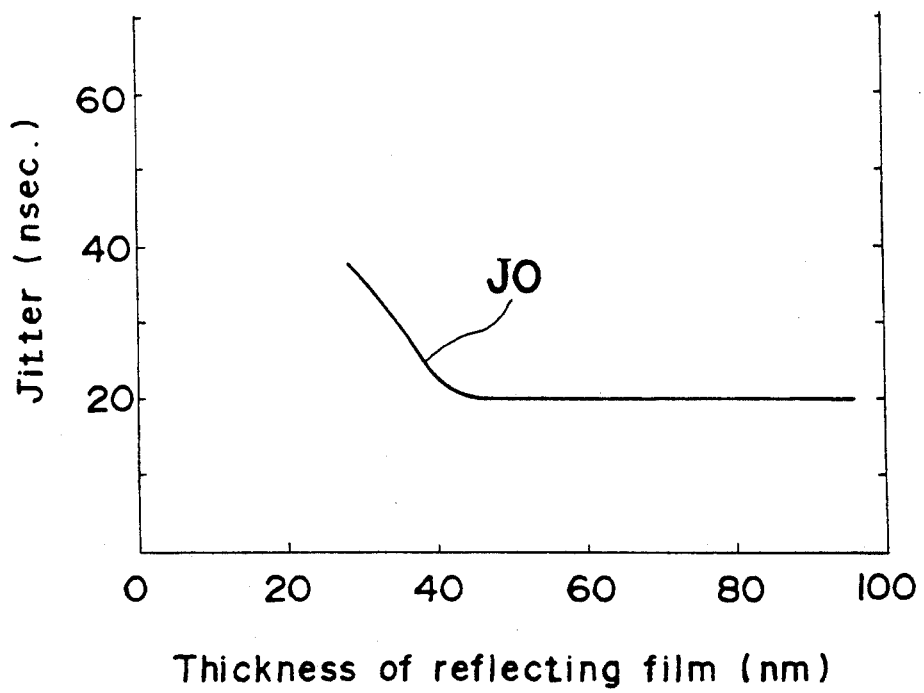
FIG. 12 is a graph showing relation between thickness of the reflecting film of the optical disk of FIG. 1 and jitter characteristics of reproduced wave form.

FIG. 12 shows results of the measurement. The jitter J0 is fixed at a minute value of about 20 nsec. when thickness of the reflecting film 5 is not less than 45 nm. However, when thickness of the reflecting film 5 is less than 45 nm, the jitter J0 is increased. Thus, when thickness of the reflecting film 5 is less than 35 nm, the jitter J0 exceeds 30 nsec. This phenomenon may take place because heat accumulation is caused by decrease of heat diffusion from the reflecting film 5 and thus, distortion of shape of the recording mark is increased. Meanwhile, as thickness of the reflecting film 5 is increased, recording sensitivity deteriorates further due to enhancement of heat diffusion effect. However, recording power is substantially saturated when thickness of the reflecting film 5 is 45 nm or more. Meanwhile, the recording level Pp is not more than 20 mW.

Namely, from a standpoint of both jitter and recording sensitivity, thickness of the reflecting film 5 suitable for heat diffusion and the recording method of the present invention should be not less than 35 nm, preferably not less than 45 nm.

Meanwhile, dependence of repetition characteristics upon thickness of the reflecting film 5 does not appear when thickness of the reflecting film 5 is not less than 35 nm. Furthermore, jitter does not increase to twice the initial value even after repeating recording 100,000 times.

Meanwhile, in this example, the reflecting film 5 is made of Au. However, also when the reflecting film 5 is made of one or an alloy of Al, Ti, Ni and Cr, the same effects as in the case where the reflecting film 5 is made of Au can be achieved.

Moreover, in the examples 1-7, linear speed is fixed at 1.25 m/sec. However, even if linear speed is changed in the range of 1.2 to 1.4 m/sec., the same effects as in the case where linear speed is fixed at 1.25 m/sec. are obtained.

The foregoing concrete examples 1-7 have exhibited the recording method of the present invention is quite effective when linear speed is low. In addition, the following concrete examples 8-14 are given to show that even when linear speed is as high as, for example, 10 m/sec., the present invention is effective in lessening distortion of the recording mark.

EXAMPLE 8

Firstly, effectiveness of the optical information recording method of the present invention at a high linear speed of 12.5 m/sec. is described in comparison with the prior art. In the same manner as in the example 1, two kinds of optical disks, namely, the optical disk A of the present invention and the known optical disk B are prepared. After an EFM signal has been recorded on the optical disk A and the prior art optical disk B by the recording laser beam irradiating method of the present invention and the known recording laser beam irradiating method, the EFM signal is reproduced and jitter of the reproduced signal is compared between the present invention and the prior art. The recording laser beam irradiating method of the present invention and the known recording laser beam irradiating method are the same as those employed in the example 1. Namely, the known recording method in which power modulation of the laser beam is directly performed between recording level and erasing level by the EFM signal and the MP recording method in which after conversion of the EFM signal into the pulse trains according to the present invention, the laser beam is modulated are employed.

However, in this example, since a linear speed of 12.5 m/sec. is employed and is 10 times higher than a linear speed of 1.25 m/sec. employed in the example 1, clock frequency of the EFM signal and the MP circuit is also set to be 10 times that of the example 1. In this example, the pulse train of FIG. 5b has the width t1 of 34.8 nsec., the width t2 of 11.6 nsec. and the clock period T of 23.2 nsec. In combinations of the optical disk A of the present invention, the known optical disk B, the MP recording method of the present invention and the known recording method, a signal overwritten 10 times on an identical recording track is reproduced and magnitude of jitter of the reproduced signal is measured.

Table 2 below shows results of the measurement. Each of values of jitter indicated in Table 2 is a minimum jitter obtained by changing the erasing level Pb and the recording level Pp in the combination of the optical disk and the recording method. The laser powers Pb and Pp yielding the minimum jitter are also shown in Table 2. As will be seen from Table 2, jitter is quite large in the combination of the known optical disk B and the known recording method. However, in the combination of the known optical disk B and the MP recording method of the present invention and the combination of the optical disk A of the present invention and the known recording method, jitter is considerably reduced. Furthermore, in the combination of the optical disk A of the present invention and the MP recording method of the present invention, jitter is remarkably reduced. Therefore, also when linear speed is high, simultaneous employment of the optical disk A and the MP recording method of the present invention is effective for reducing jitter.

TABLE 2

| Optical disk | Recording method | Jitter (nsec.) | Laser power Pb(mW) | Pp(mW) |
|---|---|---|---|---|
| B | Prior art | 20 | 5.5 | 8.8 |
| B | MP | 14 | 5.5 | 10.0 |
| A | Prior art | 15 | 8.0 | 13.8 |
| A | MP | 7 | 8.0 | 16.0 |

In the following examples 9-14, composition of the recording film and thicknesses of the recording film, the dielectric film 4 and the reflecting film 5 are further defined. When the laser beam is irradiated, jitter is made smaller in the MP recording method than in the known recording method as is seen from the example 1. Therefore, in the examples 9-14, the MP recording method having the same wave form as the example 8 is employed.

EXAMPLE 9

In this example, structure of the optical disk is the same as that of the optical disk A of the example 8 and only composition of the recording film is changed on the line connecting $Ge_2Sb_2Te_5$ and Sb. Thus, jitter and repetition characteristics of recording and erasure are measured in the same manner as in the example 8. In order to evaluate repetition characteristics of recording and erasure, jitter is measured by repeatedly recording the EFM signal at the recording level Pp and the erasing level Pb where jitter is minimized and then, the number of repetition of recording, at which jitter assumes twice an initial value, is obtained.

Figure 13:
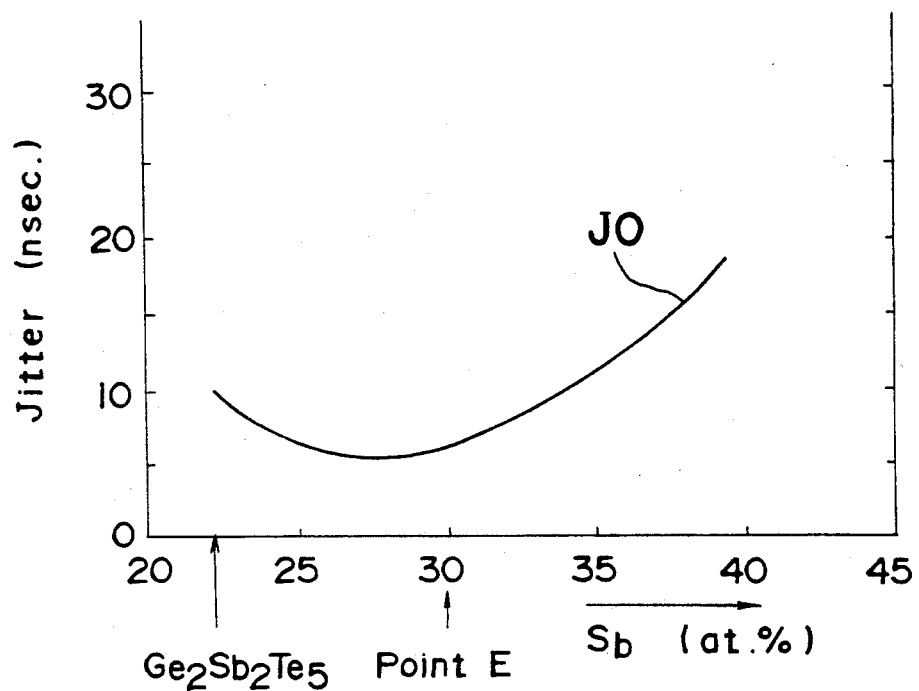

FIG. 13 shows results of the measurement. Jitter J0 of reproduced signals assumes a minimum in the vicinity of 27 atomic % of Sb. When quantity of Sb is made smaller than this point, crystallizing speed becomes high and thus, shape of the recording mark is distorted. On the contrary, when quantity of Sb is made larger than this point, crystallizing speed becomes low, so that erasure ratio deteriorates and thus, recording is adversely affected by the previously recorded signals. Thus, in both of the cases, jitter is increased. It is considered that jitter of 10 nsec. or less is not problematical for practical use. This requirement is satisfied when quantity of Sb ranges from 22 to 33 atomic %.

The repetition characteristics test is performed 100,000 times for the optical disk having the initial jitter J0 of not more than 10 nsec. such that the number C2 of repetition of recording, at which jitter assumes twice the initial value, is obtained. On the line connecting $Ge_2Sb_2Te_5$ and Sb, jitter does not increase to twice the initial value even after repeating recording 100,000 times.

From the above, it is concluded that composition of the recording film, which falls on the line connecting $Ge_2Sb_2Te_5$ and Sb and is suitable for heat diffusion and the recording method of the present invention, is 22-33 atomic % of Sb.

EXAMPLE 10

In this example, the recording film is prepared by fixing quantity of Te at 50 atomic % and changing ratio of Ge and Sb on the line connecting points F and G in FIG. 2 so as to produce the optical disk and then, signals are recorded in the same method as the example 9 such that jitter and repetition characteristics are measured. Structure of the optical disk is the same as the example 9.

Figure 14:
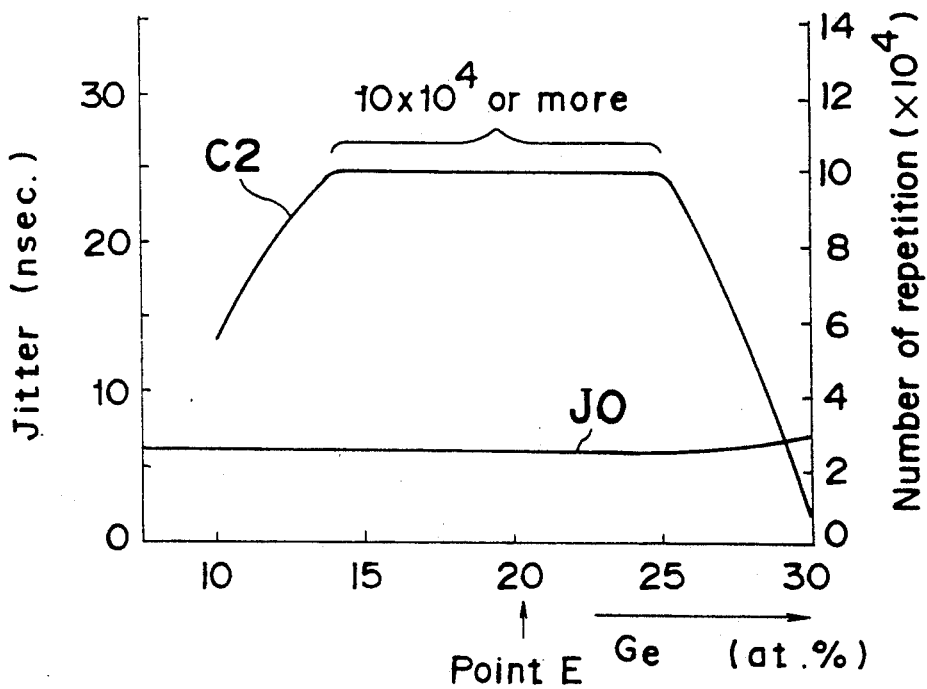

FIG. 14 shows results of the measurement. Even if quantity of Ge is changed, the initial jitter J0 is not more than 10 nsec., which is excellent.

Meanwhile, when quantity of Ge ranges from 14 to 25 atomic %, jitter does not increase to twice the initial value after repeating recording 100,000 times for repetition characteristics. However, in an area in which quantity of Ge is smaller than that of this range or in an area in which quantity of Ge is larger than that of this range, the number C2 of repetition of recording becomes less than 100,000 and thus, jitter increases to twice the initial value by repeating recording less than 100,000 times. This result is the same as that of the example 3 in which linear speed is low.

From the above, it is concluded that when quantity of Te is fixed at 50 atomic %, composition of the recording film suitable for the structure of the optical disk and the recording laser beam irradiating method of the present invention is 14–25 atomic % of Ge even if linear speed is high.

EXAMPLE 11

In this example, the recording film is prepared by fixing quantity of Sb at 30 atomic % and changing ratio of Ge and Te on the line connecting points H and I in FIG. 2 so as to produce the optical disk and then, signals are recorded in the same method as the example 9 such that jitter and repetition characteristics are measured. Structure of the optical disk is the same as the example 9.

Figure 15:
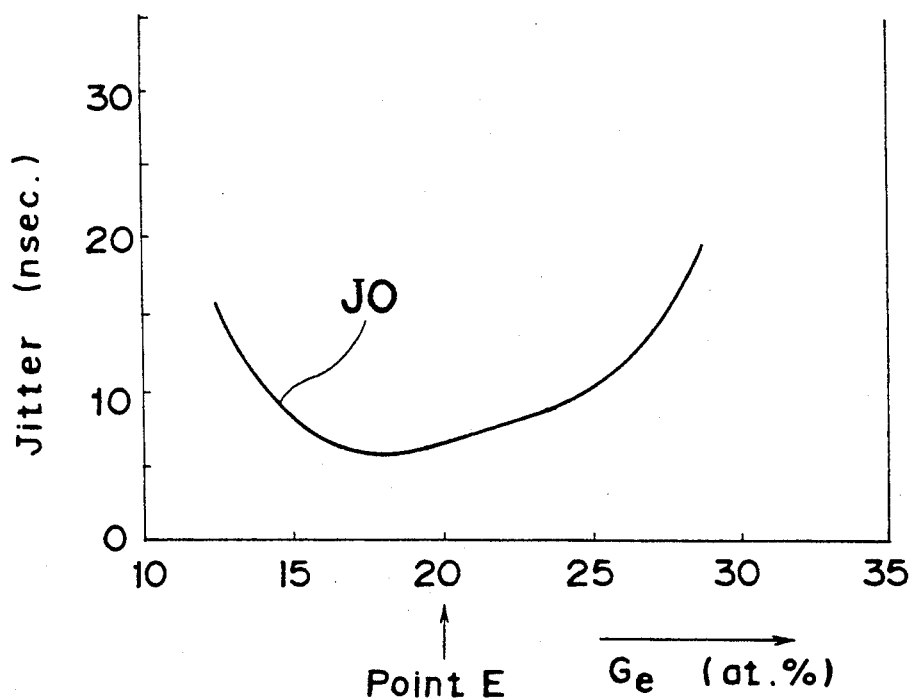
Figure 16:
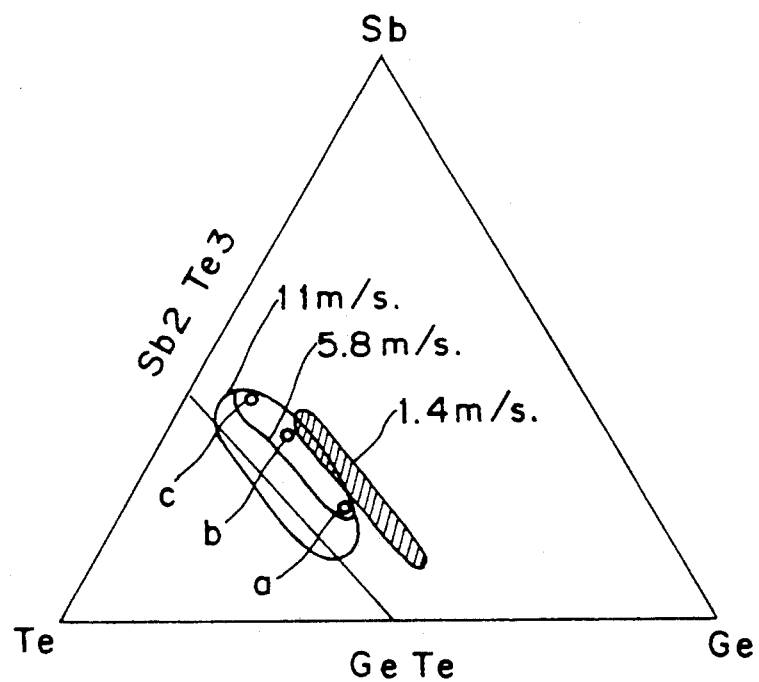
FIG. 16 is a diagram showing composition of a recording film of a prior art optical disk (already referred to)

FIG. 15 shows results of the measurement. Initial jitter J0 of reproduced signals assumes a minimum in the vicinity of 18 atomic % of Ge. If quantity of Ge is made smaller than this point, crystallizing speed becomes high and thus, shape of the recording mark is distorted. On the other hand, if quantity of Ge is made larger than this point, crystallizing speed is becomes low, so that erasure ratio deteriorates and thus, recording is adversely affected by the previously recorded signals. Thus, in both of the cases, jitter is increased. An area in which jitter is not more than 10 nsec. corresponds to quantity of Ge ranging from 14 to 22 atomic % when quantity of Sb is fixed at 30 atomic %.

The repetition characteristics test is performed 100,000 times for the optical disk having the initial jitter J0 of not more than 10 nsec. such that the number C2 of repetition of recording, at which jitter assumes twice the initial value, is obtained. In the optical disk including the recording film in which quantity of Sb is fixed at 30 atomic % and quantity of Ge is changed in the range of 14 to 22 atomic %, jitter does not increase to twice the initial value even after repeating recording 100,000 times.

From the above, it is concluded that composition of the recording film suitable for the structure of the optical disk and the recording laser beam irradiating method of the present invention is 14–22 atomic % of Ge when quantity of Sb is fixed at 30 atomic %.

Meanwhile, in the examples 8–11, linear speed is fixed at 12.5 m/sec. but the same effects can be achieved even if linear speed is changed in the range of 8 to 13 m/sec.

From the above examples 9–11, when linear speed is as high as 12.5 m/sec., composition of the recording film of GeSbTe alloy suitable for the structure of the optical disk and the recording method of the present invention falls in the region JKLM enclosed by the points J, K, L and M in FIG. 2, namely a region $Ge_xSb_yTe_z$ in which x, y and z are atomic percentages satisfying $48 \leq z \leq 55.5$, $0.5 \leq y/(x+y) \leq 0.72$ and $x+y+z=100$. Coordinates (Ge, Sb, Te) of the points J, K, L and M expressed in atomic % are as follows:

J (22.5, 22, 55.5), K (12.5, 32, 55.5),
L (14.5, 37.5, 48) and M (26, 26, 48).

EXAMPLE 12

In this example, range of thickness of the recording film, which is suitable for a linear speed of 12.5 m/sec., is determined. Structure of the optical disk and composition of the recording film are made identical with those of the optical disk A of the example 8 and only thickness of the recording film is changed. Thus, signals are recorded in a recording method similar to that of the example 9 such that jitter of the reproduced signals and recording sensitivity of the optical disk are measured.

The initial jitter J0 is fixed at a minute value of about 7 nsec. when thickness of the recording film is not more than 25 nm. However, when thickness of the recording film exceeds 25 nm, the jitter J0 is increased. Thus, when thickness of the recording film is 35 nm or more, the jitter J0 exceeds 10 nsec. Therefore, from a viewpoint of jitter, thickness of the recording film should be not more than 35 nm, preferably not more than 25 nm.

However, when thickness of the recording film is made smaller than 12 nm, the recording level Pp exceeds 20 mW due to drop of recording sensitivity. Namely, from a standpoint of recording sensitivity, thickness of the recording film is not less than 12 nm.

Namely, from a viewpoint of both jitter and recording sensitivity, thickness of the recording film suitable for heat diffusion and the recording method of the present invention should range from 12 to 35 nm, preferably from 12 to 25 nm.

Meanwhile, dependence of repetition characteristics upon thickness of the recording film does not appear when thickness of the recording film ranges from 12 to 35 nm. Furthermore, jitter does not increase to twice the initial value even after repeating recording 100,000 times.

Meanwhile, in this example, linear speed is fixed at 12.5 m/sec. but the same effects can be achieved even if linear speed is changed in the range of 8 to 13 m/sec.

From the results of this example and the example 5, it is concluded that excellent recording characteristics can be obtained at a linear speed of 1.2 to 13 m/sec. when thickness of the recording film ranges from 12 to 35 nm.

EXAMPLE 13

In this example, range of thickness of the dielectric film 4 adjacent to the reflecting film 5 is determined. Structure of the optical disk and composition of the recording film are made identical with those of the optical disk A of the example 8 and only thickness of the dielectric film 4 is changed. Then, signals are recorded in a recording method similar to that of the example 9 such that jitter of the reproduced signals and recording sensitivity of the optical disk are measured.

The jitter J0 is fixed at a minute value of about 7 nsec. when thickness of the dielectric film 4 is not more than 25 nm. However, when thickness of the dielectric film 4 exceeds 25 nm, the jitter J0 is increased. Thus, when thickness of the dielectric film 4 exceeds 40 nm, the jitter J0 exceeds 10 nsec. Therefore, from a viewpoint of jitter, thickness of the dielectric film 4 adjacent to the reflecting film 5 should be not more than 40 nm, preferably not more than 25 nm.

However, if thickness of the dielectric film 4 is reduced excessively, the recording film is disposed close to the reflecting film 5 exceedingly. As a result, since heat diffusion effect of the reflecting film 5 becomes too conspicuous, recording sensitivity drops. In this example, when thickness of the dielectric film 4 is made smaller than 7 nm, the recording level Pp exceeds 20 mW due to drop of recording sensitivity. Namely, from a standpoint of recording sensitivity, it is preferable that thickness of the dielectric film 4 is not less than 7 nm.

Namely, from a viewpoint of both jitter and recording sensitivity, thickness of the dielectric film 4 suitable for heat diffusion and the recording method of the present invention should range from 7 to 40 nm, preferably from 7 to 25 nm.

Meanwhile, dependence of repetition characteristics upon thickness of the dielectric film 4 does not appear when thickness of the dielectric film 4 ranges from 7 to 40 nm. Furthermore, jitter does not increase to twice the initial value even after repeating recording 100,000 times.

Meanwhile, in this example, linear speed is fixed at 12.5 m/sec. but the same effects can be achieved even if linear speed is changed in the range of 8 to 13 m/sec.

From the results of this example and the example 6, it is concluded that excellent recording characteristics can be obtained at a linear speed of 1.2 to 13 m/sec. when thickness of the dielectric film 4 ranges from 7 to 40 nm.

EXAMPLE 14

In this example, range of thickness of the reflecting film 5 is determined. Structure of the optical disk and composition of the recording film are made identical with those of the optical disk A of the example 1 and only thickness of the reflecting film 5 made of Au is changed. Then, signals are recorded in a recording method similar to that of the example 2 such that jitter of the reproduced signals and recording sensitivity of the optical disk are measured.

The jitter J0 is fixed at a minute value of about 7 nsec. when thickness of the reflecting film 5 is not less than 45 nm. However, when thickness of the reflecting film 5 is less than 45 nm, the jitter J0 is increased. Thus, when thickness of the reflecting film 5 is less than 35 nm, the jitter J0 exceeds 10 nsec. Meanwhile, as thickness of the reflecting film 5 is increased, recording sensitivity deteriorates further due to enhancement of heat diffusion effect. However, recording power is substantially saturated when thickness of the reflecting film 5 is 45 nm or more. Meanwhile, the recording level Pp is not more than 20 mW.

Namely, from a standpoint of both jitter and recording sensitivity, thickness of the reflecting film 5 suitable for heat diffusion and the recording method of the present invention should be not less than 35 nm, preferably not less than 45 nm in the same manner as the example 7.

In this example, linear speed is fixed at 12.5 m/sec. but the same effects can be achieved even if linear speed is changed in the range of 8 to 13 m/sec.

Meanwhile, dependence of repetition characteristics upon thickness of the reflecting film 5 does not appear when thickness of the reflecting film 5 is not less than 35 nm. Furthermore, jitter does not increase to twice the initial value even after repeating recording 100,000 times.

Meanwhile, in this example, the reflecting film 5 is made of Au. However, also when the reflecting film 5 is made of one or an alloy of Al, Ti, Ni and Cr, the same effects as in the case where the reflecting film 5 is made of Au can be achieved.

As is clear from the foregoing, in the optical information recording method of the present invention, signals are recorded, by specifying wave form of the recording laser beam, on the optical disk in which composition and thickness of the recording film, thickness of the dielectric film and thickness of the reflecting film are specified.

Therefore, in accordance with the present invention, excellent quality of reproduced signals equivalent to that of the compact disk can be obtained at a low linear speed of 1.2 to 1.4 m/sec. on a rewritable optical disk.

Furthermore, since the present invention can be applied also to high linear speed, signal quality of, for example, a rewritable moving picture file, a data file, etc. is improved, thereby resulting in recording and reproduction at higher density.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical information recording method in which a digital signal subjected to pulse width modulation is overwritten on an optical disk by using one laser spot;
   the optical disk including a first dielectric film, a recording film, a second dielectric film and a reflecting film stacked on a substrate in this order;
   the recording film having composition defined by a formula $Ge_xSb_yTe_z$ wherein x, y and z are atomic percentages satisfying $45 \leq z \leq 55.5$, $0.5 \leq y/(x+y) \leq 0.72$ and $x+y+z=100$;
   the recording film having a thickness of 10 to 35 nm;
   the second dielectric film having a thickness of 5 to 40 nm;
   the reflecting film being made of one or an alloy of at least Au, Al, Ti, Cr and Ni and having a thickness of 35 nm or more;
   the optical information recording method comprising the steps of:
   converting each of a plurality of pulses contained in the digital signal, into a pulse train composed of a plurality of pulses; and
   modulating a laser power between an erasing level and a recording level by the pulse train and forming a recording mark on the optical disk by the pulse train so as to record the digital signal on the optical disk;
   wherein the step of converting the plurality of pulses into the pulse train further comprising the step of forming the pulse train having a leading pulse and a subsequent pulse train;
   wherein the pulses of the subsequent pulse train have an identical width and being arranged at an identical interval;
   wherein the leading pulse having, at all times irrespective of length of the recording mark, a fixed width larger than the width of each of the pulses of the subsequent pulse train;
   wherein when the recording mark has an n-th length (n=natural number), the number of the pulses in the subsequent pulse train is (n−1).

2. An optical information recording method as claimed in claim 1, wherein the atomic percentages x, y and z satisfy $45 \leq z \leq 53$, $0.5 \leq y/(x+y) \leq 0.72$ and $x+y+z=100$, while relative speed between the laser spot and the optical disk ranges from 1.2 to 1.4 m/sec.

3. An optical information recording method as claimed in claim 1, wherein the atomic percentages x, y and z satisfy $48 \leq z \leq 55.5$, $0.5 \leq y/(x+y) \leq 0.72$ and $x+y+z=100$, while relative speed between the laser spot and the optical disk ranges from 8 to 13 m/sec.

4. An optical information recording method as claimed in claim 1, wherein the atomic percentages x, y and z satisfy $48 \leq z \leq 53$, $0.5 \leq y/(x+y) \leq 0.72$ and $x+y+z=100$, while relative speed between the laser spot and the optical disk ranges from 1.2 to 13 m/sec.

5. An optical information recording method as claimed in claim 1, wherein the composition of the recording film falls on a line connecting compound $Ge_2Sb_2Te_5$ and Sb in a composition diagram of equilateral triangle having Ge, Sb and Te set at its vertexes, respectively.

6. An optical information recording method as claimed in claim 5, wherein the composition of the recording film is represented by $Ge_{20}Sb_{30}Te_{50}$.

7. An optical information recording method as claimed in claim 1, wherein the thickness of the recording film ranges from 12 to 35 nm.

8. An optical information recording method as claimed in claim 7, wherein the thickness of the recording film ranges from 12 to 25 nm.

9. An optical information recording method as claimed in claim 1, wherein the first and second dielectric films are made of at least one of ZnS, $SiO_2$, $Si_3N_4$, AlN, $Ta_2O_5$, TiN and ZnSe, a mixture of ZnS and $SiO_2$ or a mixture of ZnSe and $SiO_2$.

10. An optical information recording method as claimed in claim 1, wherein the thickness of the second dielectric film ranges from 7 to 40 nm.

11. An optical information recording method as claimed in claim 10, wherein the thickness of the second dielectric film ranges from 7 to 25 nm.

12. An optical information recording method as claimed in claim 1, wherein the thickness of the reflecting film is 45 nm or more.

13. An optical information recording method as claimed in claim 1, wherein the laser power is modulated between the recording level and a reproducing level or an OFF level only during a period of a corresponding pulse width of the pulse train prior to its conversion.

14. An optical information recording method as claimed in claim 1, wherein the laser power is lowered to a reproducing level or an OFF level during a predetermined period following the subsequent pulse train.

15. An optical information recording method as claimed in claim 1, wherein the digital signal is an EFM signal conforming to compact disk standards.

* * * * *